United States Patent [19]

Svensson

[11] Patent Number: 4,553,235
[45] Date of Patent: Nov. 12, 1985

[54] APPARATUS FOR CONNECTING DIGITAL TERMINALS TO A DIGITAL EXCHANGE

[75] Inventor: Lars T. E. Svensson, Stockholm, Sweden

[73] Assignee: Telefonaktiebolaget LM Ericsson, Stockholm, Sweden

[21] Appl. No.: 574,101

[22] PCT Filed: Apr. 27, 1983

[86] PCT No.: PCT/SE83/00167
§ 371 Date: Dec. 21, 1983
§ 102(e) Date: Dec. 21, 1983

[87] PCT Pub. No.: WO83/04115
PCT Pub. Date: Nov. 24, 1983

[30] Foreign Application Priority Data
May 7, 1982 [SE] Sweden .................... 8202896

[51] Int. Cl.⁴ ............................. H04J 6/00
[52] U.S. Cl. ............................. 370/94; 370/85; 340/825.5
[58] Field of Search .......... 370/94, 85, 60, 89; 340/825.5

[56] References Cited

U.S. PATENT DOCUMENTS 4,161,779  7/1979  Spencer et al. .......... 364/200
4,450,554  5/1984  Steensma et al. ........ 370/94
4,494,113  1/1985  Yamaoka et al. ........ 370/85

Primary Examiner—Douglas W. Olms
Attorney, Agent, or Firm—Roberts, Spiecens & Cohen

[57] ABSTRACT

An apparatus is provided in a digital communication system for connecting digital terminals to a terminal junction point which in turn is in communication with a digital exchange. The terminal junction point contains directing means (9) for sending, in a first state, a flag signal both to all terminals (3) and to the exchange (1) and sending, in a second state, an information packet received from a terminal both to the exchange and to all terminals. The terminals have means (27,28) for sending an information packet in response to the flag signal having been received a given number of times, the reception of the packet at the junction point resetting the directing means to its second state. The terminal also contains comparison means for determining whether the packet information sent back from the junction point corresponds to the terminal's own sent-out packet information, and for disconnecting the terminal in the opposite case.

5 Claims, 5 Drawing Figures

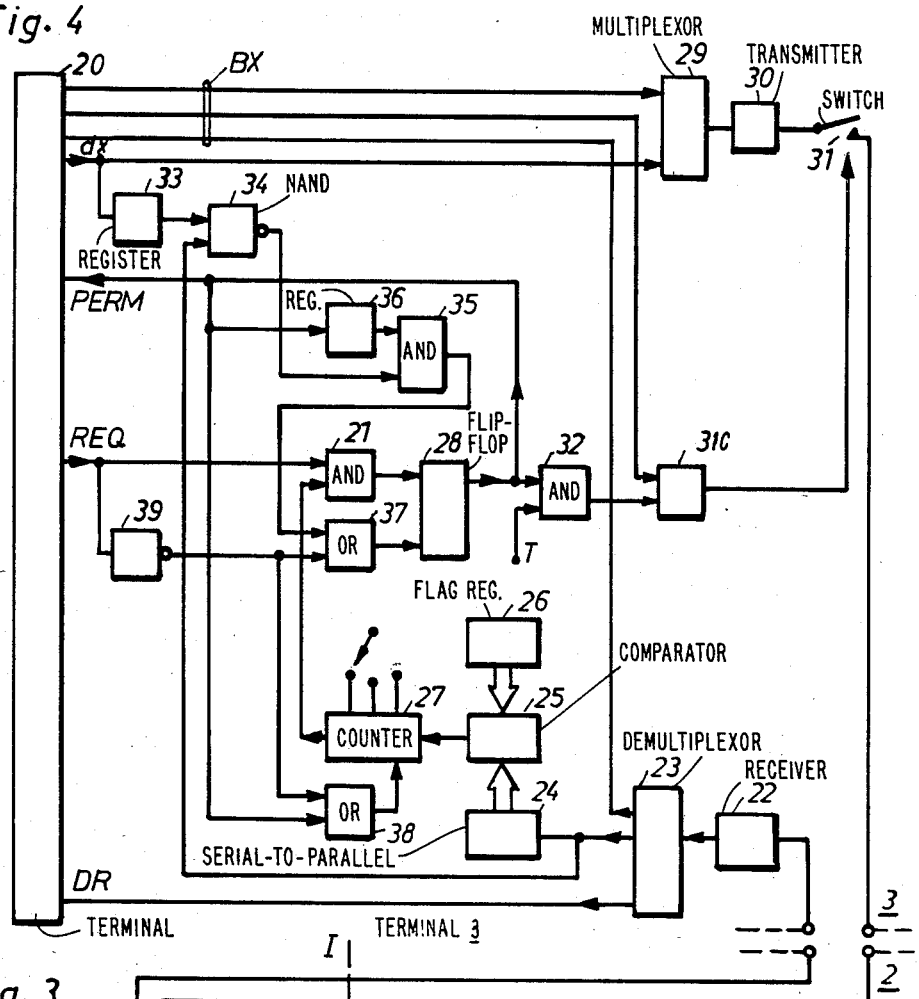
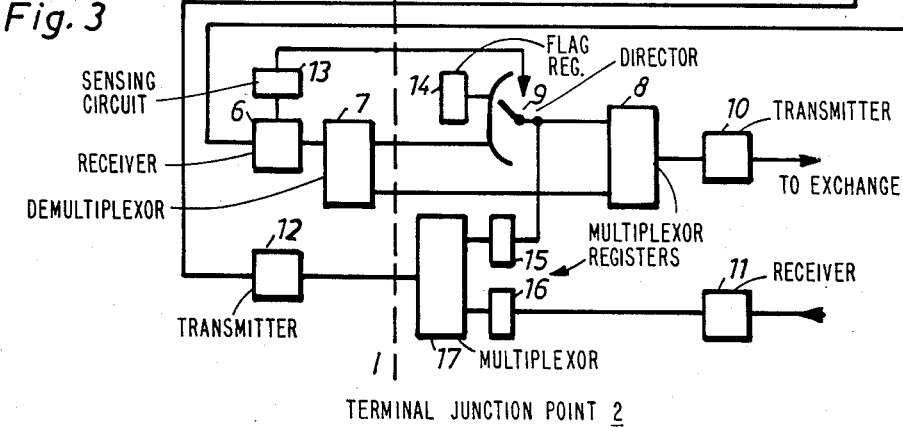

APPARATUS FOR CONNECTING DIGITAL TERMINALS TO A DIGITAL EXCHANGE

FIELD OF INVENTION

The invention relates to an apparatus for connecting digital terminals to a digital exchange via a terminal junction point.

BACKGROUND

In future digital communication systems including terminals for both data transmission and speech connections (Integrated Services Digital Network, ISDN) the subscribers will be connected to digital exchanges via digital subscriber lines. Through a bus network or a star network, all the terminals will be in communication with a terminal junction point, which in turn is connected to the exchange.

Different solutions are conceivable for multiple access in a digital subscriber connection. One possibility is polling, for example, where the terminal junction point gives permission to the terminals to send in a given order. The method requires that each terminal has an unambigous individual address, which causes large practical problems however.

According to another solution, the terminal wanting to send data information investigates whether the data channel send direction is idle and the channel is then engaged, while if this is not the case there is a wait of one time interval before a new attempt to send is made. If several terminals start sending simultaneously, this is detected and sending is interrupted by all the terminals. Collision is usually detected by the signals on the transmission medium having an unexpected distortion. This method requires that each terminal has access to signal information from all the other terminals, which is a disadvantage.

The aforementioned solutions are described in the publication "Multiaccess Protocols in Packet Communication Systems", IEEE Trans. on Comm, Vol COM-28 NO 4 April 1980, Fouad A. Tobagi.

SUMMARY OF INVENTION

An object of the invention is to provide an apparatus which gives multiple access, with the aid of simple means, to a digital subscriber line, and enables the utilization of the same terminal interface for both bus and star structures.

In achieving the above and other objects of the invention, there is provided an apparatus in a digital communication system for connecting digital terminals to a terminal junction point which in turn is connected to a digital exchange, the apparatus being characterized in that the terminal junction point contains a directing means sending in a first state a flag signal to all terminals as well as to the exchange where the signal is utilized for filling out empty space in the information flow and in its second state sending an information packet received from a terminal towards the exchange as well as to all terminals. The terminals furthermore contain means for sending out an information packet in response to the flag signal having been received a given number of times. The reception of the information packet at the junction point resets the direction means to its second state. The terminal includes comparison means for determining whether the packet information sent back from the junction point corresponds to the terminal's own sent-out packet information. Furthermore, there is included means responsive to the comparison means disconnecting the terminal if the sent-out packet information is different from the sent-out packet information.

The above and other objects, features and advantages of the invention will be found in the detailed description which follows hereinafter.

BRIEF DESCRIPTION OF DRAWINGS

The invention will be described in detail below in the form of an embodiment illustrated in the accompanying drawing in which:

FIG. 3 illustrates a terminal junction point for co-operation with bus-connected terminals;

FIG. 4 illustrates a terminal and FIG. 5 illustrates a terminal junction point for co-operation with star-connected terminals.

DETAILED DESCRIPTION OF INVENTION

Figure 1:
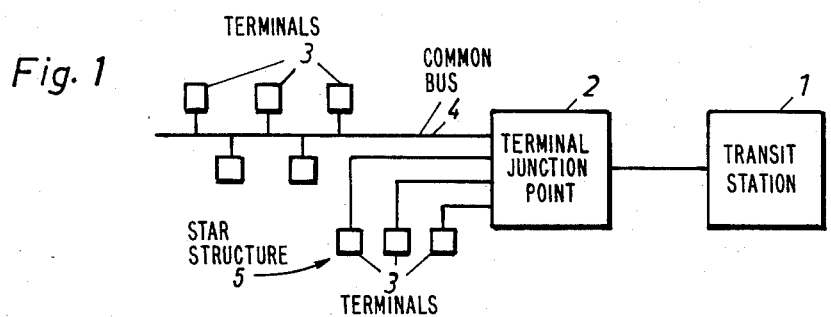
FIG. 1 illustrates a terminal junction point to which terminals are connected via a bus line or via lines connected in star pattern.

FIG. 1 schematically illustrates a digital communication system including a transit station 1 with a plurality of terminal junction points 2, of which one is shown. The terminals 3 may be connected to the terminal junction points via a common bus 4 as well as in the form of a star structure 5.

Information interchange between subscriber and exchange takes place via an information packet channel or D channel and also via one or more information interchange channels or B channels, according to a planned standard. All the channels are bi-directional, the D channels having a bit rate of 16 kbits/s and the B channels a bit rate of for example 64 kbits/s. The B channels are utilized for transmitting information between set-up connections, which means that if a terminal occupies a B channel the latter will be engaged the whole time the connection is set up. On the other hand, information is transmitted in packet form in the D channel, which means that a terminal utilizes the channel in the send direction only during the time intervals when it has information to transmit, and other terminals can utilize the channel between such intervals. As distinguished from the B channels, the D channel can thus be utilized for several simultaneous connections, provided that the total quantity of data to be transmitted does not exceed the channel capacity. The invention enables utilization of the D channel in the most efficient way. What has been said above with regard to the speed and use of the channels is not novel, but corresponds to planned CCITT standards for the future.

Figure 2:
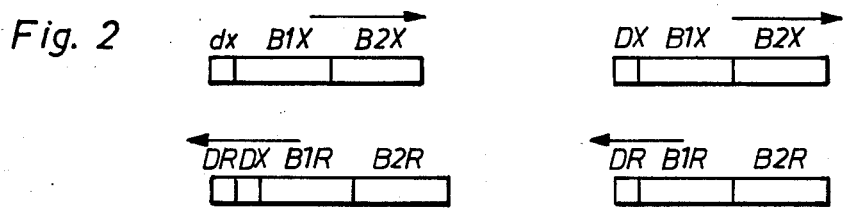
FIG. 2 shows the frame configuration for signalling from the terminals to the exchange; and in the opposite direction.

FIG. 2 illustrates the frame configuration used for signalling from the terminals to the exchange and vice versa via the terminal junction points. By dx is denoted the information in the D channel transmitted from a terminal to the junction point, and DX the corresponding information which is forwarded from the junction point to the exchange. In the same way, DR denotes information transmitted from exchange to junction point and to the terminal over the D channel respectively. B1X, B2X and B1R, B2R, respectively, denote information transmitted via an established connection and having no importance from the inventive aspect. Two 64 kbits/s channels, for example, are used for the latter information, while a 16 kbits/s channel is used for the data packet information.

According to the invention, there is a further channel of, e.g. a 16 kbits/s which is added to the information sent from the exchange to the junction point when this information is forwarded from the junction point to the terminal. In this outband channel there is sent back the information DX which the terminal junction point 2 sends to the exchange. The outband channel of course implies a requirement of increased capacity in the transmission between junction point and terminals, but this is of less importance, since the lines in a subscriber installation are relatively short, the transmission capacity thus not being a limiting factor. The cost caused by an increase of the channel capacity between junction point and terminals is substantially less than the advantage achieved by the setting up method.

FIG. 3 illustrates a terminal junction point 2 for use in terminals connected in a bus structure. A receiver 6 receives signals from the terminals, and via a demultiplexor 7 forwards these to a multiplexor 8, directly in the case of BX-type signals and via directing means 9 in the case of dx-type signals. For communication with the exchange there is a transmitter 10 and a receiver 11, and for communication with the terminals there is a transmitter 12. A sensing circuit 13 senses whether any signal of the dx-type is present in the information received from the terminals. Should there be no such signal, the directing means 9 is not affected, maintaining instead its idle state in which it connects a flag register 14 to the line going to the exchange. As soon as a dx-type signal occurs, the directing means 9 is reset by a control signal from the sensing circuit 13, whereby the signal received from the terminal is fed to the line going to the exchange. Accordingly, as long as there is no dx-type signal present, a flag signal is fed both to the terminals and the exchange to form padding information indicating that no information transmission over the channel occurs. The flag signal can be of the form 01111110 or 11111111, so that there is no danger for mixing together with data signals, since the normal data information is supposed to be of the type having at most five successive "ones". Registers 15, 16 store the signals obtained from the terminals and from the exchange, respectively, before these are fed to the terminals by a multiplexor 17. In this case the multiplexor has a bit rate which, apart from the normal channels of 16,64 and 64 kbits/s, can carry a further channel of 16 kbits/s, i.e. it has a bit rate of at least 160 kbits/s.

FIG. 4 schematically illustrates a terminal and explains its co-operation with the terminal junction point illustrated in FIG. 3. Only the parts necessary for explaining the inventive principle are shown. It is assumed that sending and receiving B-type information, i.e. information communication in a set-up condition, and D-type information, i.e. communication between the terminal and station, are carried out conventionally. The terminal and its conventional parts is denoted by 20. When the terminal needs to utilize the data packet channel for sending, this is indicated by a call signal REQ. For this signal to become active there is required a logical decision by the AND circuit 21 also having its second input activated, it first input being fed with the call signal. The flag signal obtained from the junction point 2 when the directing means 9 is in its first position is fed via a receiver 22 and a demultiplexor 23 to a series-parallel converter 24, and is compared in a comparison circuit 25 with the contents of a flag register 26.

In case of conformity, a signal is fed to a counter 27, the counter being settable with the aid of a switch in correspondence to the terminal priority, so that the flag signal must occur a given number of times before an activating signal is sent from the counter to the second input of the AND circuit 21. The output signal from the AND circuit 21 resets a bistable flipflop 28, which in this state feeds a send permission signal PERM to the terminal equipment 20, implying that the signal dx is sent out by the multiplexor 29 and the transmitter 30. The transmission is carried out under control of a switch 31, activated by the send permission signal PERM from the output of the bistable flipflop 28 via an AND circuit 32, the second input of which is activated by a time signal T during the time periods reserved for the dx signal messages. The sent dx signal is also stored in a register 33 for enabling comparison with the information coming from the junction point in the outband channel, such information now being sent out due to the fact that the directing means 9 have been reset by the received dx signals, and is fed to the second input of the negating AND circuit 34, to the other input of which the contents of the register 33 is supplied. If there is no conformity between these two signals, this signifies that interference with a signal from another terminal has occurred, resulting in that an AND circuit 35, one input of which is kept activated by the send permission signal PERM delayed in a register 36, sends an output signal via the OR circuit 37 and resets the bistable flipflop 28 to its inactive state, whereby sending of the signal to the terminal junction point ceases.

The flip-flop 28 also will be reset when the REQ-signal ceases due to an inverting circuit 39 which through the OR-circuit will activate the reset input of the flip-flop. The counter 27 is set to zero via the OR circuit 38 when the call signal REQ ceases, or when the send permission signal PERM occurs.

As will be appreciated, the invention enables a plurality of digital terminals which are connectable via a common bus line to a common terminal junction point, to be connected thereto in accordance with a given order of priority, and if several terminals call simultaneously, the terminal is selected whose own call signal re-sent from the junction point agrees with the delayed signal stored in the terminal, while the remaining terminals are disconnected.

Figure 5:
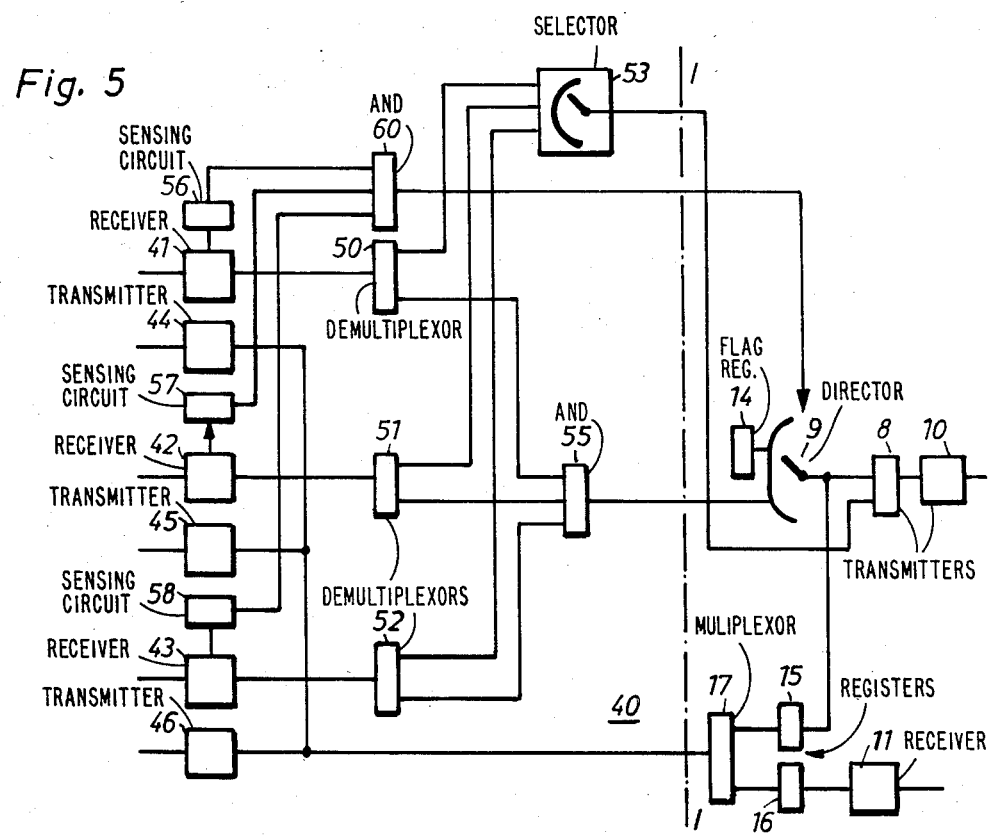

Both terminals and junction point can also be used in a star-pattern connection of terminals, with the only difference that in this case a supplementary circuit 40 is required, as will be seen from FIG. 5. The dashed line I-I denotes the boundary between the junction point itself and the equipment required for respectively connecting terminals via a common bus or star pattern connection of a number of terminals. There are receivers 41, 42, 43 via which the signals are received from respective terminals, and transmitters 44, 45, 46 via which the signals are forwarded to the terminals. A demultiplexor 50, 51, 52 is associated with each of the receivers for feeding the received BX-type signals via selector 53, which is not described further, to the transmitter 10 for transmission to the exchange 1, and for feeding the dx-type signals to an AND circuit 55. Sensing circuits 56, 57, 58 sense, in the same way as the sensing circuit 13 in FIG. 3, whether any dx-type signal is present on the respective line, and as long as there is no such signal it sends a "1" signal to an AND circuit 60. The output signal from this circuit constitutes a control signal to the directing means 9 in the same way as the signal from the sensing circuit 13 in FIG. 3, such that as long as no dx-type signal occurs, the directing means is kept in the state where it feeds out to the flag signal.

The AND circuit 55 has the task of returning a binary signal to all the terminals in response to the binary signals received from all the connected terminals via the directing means 9. According to the example, a binary 0 is recongnised as a working signal, indicating that a terminal has been activated, whereas the absence of a signal from non-activated terminals results in that the demultiplexor feeds the binary value 1 to the AND circuit 55. As soon as the binary value at a terminal is changed to 0 as a result of activation, the output signal of the AND circuit is changed to 0 and in comparison with the value stored in the register 33 of the respective terminals, the terminals which have the value 1 are disconnected, and the terminal with the value 0 is retained corrected, as will be apparent from FIG. 4. A "1" instead of a "0" can, of course, be selected for the working state provided with a suitable logical circuit is selected.

What is claimed is:

1. Apparatus in a digital communication system for connecting digital terminals to a terminal junction point which in turn is connected to a digital exchange, characterized in that the terminal junction point includes a directing means (9) sending in a first state a flag signal to all terminals (3) as well as to the exchange (1) where said signal is utilized, for filling out empty space in the information flow, and in its second state sending an information packet received from a terminal toward the exchange as well as to do all terminals; the terminals including means (27, 28) for sending out an information packet, in response to the flag signal having been received a given number of times, the reception of said information packet at the junction point resetting said directing means to its second state; the terminal including comparison means (34) for determining whether the packet information sent back from the junction point corresponds to the terminal's own sent-out packet information, and means responsive to said comparison means for disconnecting the terminal if the sent back packet information is different from the sent-out packet information.

2. Apparatus as claimed in claim 1, wherein in that the junction point contains means (15, 17) for sending back to the terminals over a supplementary channel the data packet information received from these terminals, the terminals containing means (23, 24) for receiving information over this supplementary channel.

3. Apparatus as claimed in, claim 1 wherein the junction point (2) is provided with a sensing circuit (13, 56, 57, 58) for each incoming line, said circuit sensing for the data packet signals, and as long as such data packet signals are not occurring, keeping the directing means in its flag signal-sending state.

4. Apparatus as claimed in, claim 1 wherein the junction point includes a logical circuit (60) which keeps the directing means (9) in its flag signal-sending state in the absence of data packet signal from the terminals.

5. Apparatus as claimed in, claim 1 wherein the junction point includes a logical circuit (55), receiving at its inputs the binary values of the data packet signals, and via the directing means (9) supplying back the logical signal obtained on its output to the terminals, those of the terminals sending binary signals different from said logical signal being disconnected, so that the binary signals from that of the terminals which has not been disconnected can pass through the logical circuit without obstacle.

* * * * *